United States Patent
Eby

(10) Patent No.: US 9,339,006 B1
(45) Date of Patent: May 17, 2016

(54) PET KENNEL SYSTEM

(71) Applicant: Michael L. Eby, Henderson, NV (US)

(72) Inventor: Michael L. Eby, Henderson, NV (US)

( * ) Notice: Subject to any disclaimer, the term of this patent is extended or adjusted under 35 U.S.C. 154(b) by 0 days.

(21) Appl. No.: 14/272,008

(22) Filed: May 7, 2014

Related U.S. Application Data

(60) Provisional application No. 61/820,412, filed on May 7, 2013.

(51) Int. Cl.
*A01K 1/02* (2006.01)
*A01K 1/03* (2006.01)

(52) U.S. Cl.
CPC ...................... *A01K 1/034* (2013.01)

(58) Field of Classification Search
CPC ..... A01K 1/035; A01K 1/033; A01K 1/0245; A01K 1/0353; A01K 1/0107; A01K 1/0236; A01K 1/03; A01K 1/032; A01K 1/034; A01K 31/08
USPC ........ 119/484, 474, 165, 452, 28.5, 481, 497, 119/498, 501
See application file for complete search history.

(56) References Cited

U.S. PATENT DOCUMENTS

| | | | | |
|---|---|---|---|---|
| 3,738,322 A | * | 6/1973 | Smith | 119/484 |
| 4,029,048 A | * | 6/1977 | Gershbein | 119/165 |
| 4,445,459 A | * | 5/1984 | Julie | 119/28.5 |
| 4,484,540 A | * | 11/1984 | Yamamoto | 119/497 |
| 4,788,934 A | * | 12/1988 | Fetter | 119/484 |
| 4,989,546 A | | 2/1991 | Cannaday | |
| 5,261,350 A | * | 11/1993 | Vavrek | 119/484 |
| 5,522,344 A | * | 6/1996 | Demurjian | 119/474 |
| 5,649,500 A | * | 7/1997 | Klavemann et al. | 119/452 |
| 5,890,455 A | * | 4/1999 | Donchey | 119/484 |
| 6,029,609 A | * | 2/2000 | Bahar et al. | 119/474 |
| 6,394,035 B1 | | 5/2002 | Hill | |
| 6,722,315 B2 | | 4/2004 | Sinor | |
| 6,912,974 B2 | | 7/2005 | Ozeri et al. | |
| 7,021,242 B2 | * | 4/2006 | Axelrod | 119/496 |
| 7,178,482 B1 | | 2/2007 | Derrick | |
| 8,286,591 B2 | | 10/2012 | Moffett-Chaney et al. | |
| 8,733,292 B2 | * | 5/2014 | Nichols | 119/474 |
| 8,925,492 B2 | * | 1/2015 | Cantwell et al. | 119/474 |
| 2011/0226189 A1 | | 9/2011 | Dani Piliero | |

* cited by examiner

*Primary Examiner* — Yvonne Abbott-Lewis
(74) *Attorney, Agent, or Firm* — Glenn E. Gold; Gold & Rizvi, P.A.

(57) ABSTRACT

A pet kennel configured to restrain a pet indoors while allowing access to out-of-doors includes a bottom and a plurality of peripheral panels attached to the bottom and extending upwardly therefrom and wherein at least one of the panels is constructed of a durable mesh. A top is affixed to an upper edge of the plurality of peripheral panels. At least one access door is integrated in one of the panels and is selectively openable and closable for access to an interior of the kennel. One of the panels other than the panel with the door is removable therefrom and defines an end perimeter. A bracket assembly is joinable with an end of at least one of the panels other than the panel with the integrated door.

18 Claims, 7 Drawing Sheets

US 9,339,006 B1

PET KENNEL SYSTEM

CROSS-REFERENCE TO RELATED APPLICATION

This U.S. non-provisional patent application claims the benefit of U.S. provisional patent application No. 61/820,412, filed on May 7, 2013, which is incorporated herein in its entirety by reference thereto.

FIELD OF THE INVENTION

The present disclosure generally relates to pet kennels and there usage. More particularly, the present disclosure relates to an animal crate attachable to a portion of a home structure having an integral animal door for allowing the animal outdoor access while being constrained by the crate from freely roaming the interior of the home.

BACKGROUND OF THE INVENTION

Pet owners have a responsibility for the proper care of their pets. This care includes providing adequate food and water, and appropriate shelter. The sheltering is of additional import in areas where the weather can reach relative extremes of cold and heat. While some pet owners elect to keep their pets—and in particular dogs—continually outdoors, the extreme temperatures during the winter and summer months can prove detrimental to the pet's health and even result in weather-related death.

Many pet owners enjoy having their dogs indoors. As such, the dogs must be periodically exercised outdoors so that they can perform their bodily elimination requirements. Many individuals will utilize a pet crate to aid in training the dog to eliminate out-of-doors to avoid accidents indoors. Also, many dogs are left inside of the home while family members are at work, attending school, or engaging in other activities outside of the home. When a dog is left at home alone, the homeowner has essentially three options: leaving the pet out-of-doors during the duration of the pet owner's absence; allowing the pet to roam the interior of the home until the owner returns; or crating the pet for the duration of the pet owner's absence.

Likewise, there may be situations in which a pet owner is desirous of keeping a dog crated even though the pet owner is at home. Furthermore, even in this scenario, there are instances where it would be desirable to have the pet confined within a crate, but with free access to an area outside of the home. For example, such an arrangement would aid pet owners having a dog recovering from surgery, recovering from an ailment, aged and/or incontinent, and for whom there is a need to go outside at will while being prevented from harming the inside of the home if left to roam at will.

A partial solution to this problem has been the installation of pet doors, which are permanently installed in a wall of the home structure or in an exterior door, thereby permitting the dog free access into and out of the home. In this manner, a dog that is house trained can freely exit the home to do its "duty" and then to return to the interior.

However, this does not present a complete solution for many homeowners whom do not wish to allow their dogs to have free roaming access to the interior of the home. Accordingly, it would be highly desirable to provide an apparatus that would enable a pet owner to keep a pet crated while indoors, while facilitating free egress through a pet door to access an area outside of the home. It would be beneficial to provide such an apparatus having a collapsible construction facilitating transport and storage of the apparatus in a non-deployed state.

SUMMARY OF THE INVENTION

The present disclosure is generally directed to a pet kennel system configured to facilitate confinement of a pet while residing within the interior of the home, while simultaneously providing egress to an area outside of the home.

Generally, the pet kennel system has a primarily conventional kennel structure, but incorporates a removable side panel in combination with means for abutting the same kennel side (i.e., the side having the removable panel) up against a structural wall of the home having an integral pet ingress/egress door, along with means for maintaining engagement of the open kennel side against the structural wall, such that a pet can be confined within the kennel structure while within the home interior, while having free access to an area outside of the home via the pet ingress/egress door.

In an aspect, the open side of the kennel system may incorporate structural elements permanently attaching the open side of the kennel structure to the permanent home structural wall such that the perimeter of the open side surrounds the pet ingress/egress door.

In another aspect, the open side of the kennel system may incorporate structural elements providing selective releasable attachment of the open side of the kennel structure to the permanent home structural wall.

In still another aspect, the kennel structure may be provided butting up against the permanent home structural wall, but not directly affixed to the wall. For example, the system may incorporate structural elements provided for attachment—permanent or temporary—of the kennel structure to a permanent floor of the home.

In a further aspect, the kennel may have a collapsible construction.

In an exemplary implementation, a kennel is providing including a bottom, a top, and a plurality of side panels extending vertically upward from the periphery of the bottom between the bottom and the top. At least one pet access door is provided integrated into at least one of the side panels, movable between opened and closed positions for controlling ingress/egress of the pet into/from the kennel interior. At least one side panel is constructed and configured to be easily detached from the remainder of the kennel structure, or repositioned but still attached to the kennel structure, such that the corresponding side of the kennel structure is temporarily removed to result in an open kennel side. A mechanical attachment subsystem is provided for enabling the aforementioned open kennel side to be fixedly attached to the permanent home structural wall One of the panels other than the panel with the door is removable therefrom and defines an end perimeter. A bracket assembly is joinable with an end of at least one of the panels other than the panel with the integrated door.

In another aspect, the peripheral panels comprise two end panels and two side panels.

In yet another aspect, one of each of the end panels and the side panels includes an access door that can be selectively moved between opened and closed positions and integrated therein for access to an interior of the kennel.

In a further aspect, the removable panel is opposite the end panel having the access door integrated therein.

In another aspect, the bracket assembly includes at least two pins extending vertically therefrom and further wherein an end of the top includes a number of receivers corresponding to the pins. Each receiver defines a vertical aperture therethrough wherein each receiver receives one of the pins therein.

In another aspect, at least one of the vertical pins is selectively lockable to prevent the pin from being removed from a corresponding one of the receivers.

In a still further aspect, a plurality of clamps engage a portion of the end perimeter defined by the site panels wherein the clamps include fasteners therethrough for permanently affixing the clamps to a structural element of a building interior and co-located with a pet door installed therethrough.

In yet another aspect, the kennel defines an end perimeter at the removable end panel of the kennel, and an end of the top and ends of the side panels together define a portion of the end perimeter, including a plurality of receivers each defining a vertical aperture therethrough, and further wherein the bracket assembly includes a bracket conforming to a plurality of panels defining the end perimeter and a plurality of vertical pins are affixed thereto, each vertical pin being received in the aperture of one of the receivers.

In another aspect, at least one of the vertical pins is selectively lockable to prevent the pin from being removed from a corresponding one of the receivers.

In still another aspect, a method of kenneling a pet within a building structure having a pet door installed therethrough, and simultaneously permitting the pet free access to an exterior of the building, includes: (1) obtaining a pet kennel of the type having a plurality of side- and end-panels forming a kennel periphery and affixed to a top and bottom, wherein one of the panels is removable therefrom and forms an end perimeter, and wherein another of the panels includes a door therethrough which is selectively movable between and opened and closed position, the end perimeter having at least two receivers attached thereto, each receiver defining a vertical aperture, and a bracket assembly having a plurality of vertical pins, each vertical pin corresponding to one of the receivers; (2) affixing the bracket assembly to the building structure above the pet door; (3) attaching the kennel to the bracket assembly in a manner wherein the vertical apertures of the receivers are telescopically sleeved over the vertical pins of the bracket assembly; (4) placing the pet in the kennel through the door in the kennel panel; and (5) securing the kennel door in its selectively closed position.

In yet another aspect, after the step of attaching the kennel to the bracket assembly, the method also includes the step of securing at least one clamp to an end of each panel defining the end perimeter and further securing each clamp to the building structure.

In another aspect, at least one of the vertical pins is selectively lockable to prevent the pin from being removed from a corresponding one of the receivers and the method includes, after the attachment step, the step of locking at least one of the pins to the corresponding receiver sleeved thereover.

In still another aspect, the bracket assembly includes a bracket conforming to a plurality of panels defining the end perimeter, wherein a plurality of vertical pins are affixed thereto and further wherein the end of the top and ends of the side panels defining a portion of the end perimeter includes a plurality of receivers, each receiver corresponding to a vertical pin of the bracket assembly.

In yet another aspect, at least one of the vertical pins is selectively lockable to prevent the pin from being removed from a corresponding one of the receivers, and the method includes, after the attachment step, the step of locking at least one of the pins to the corresponding receiver sleeved thereover.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
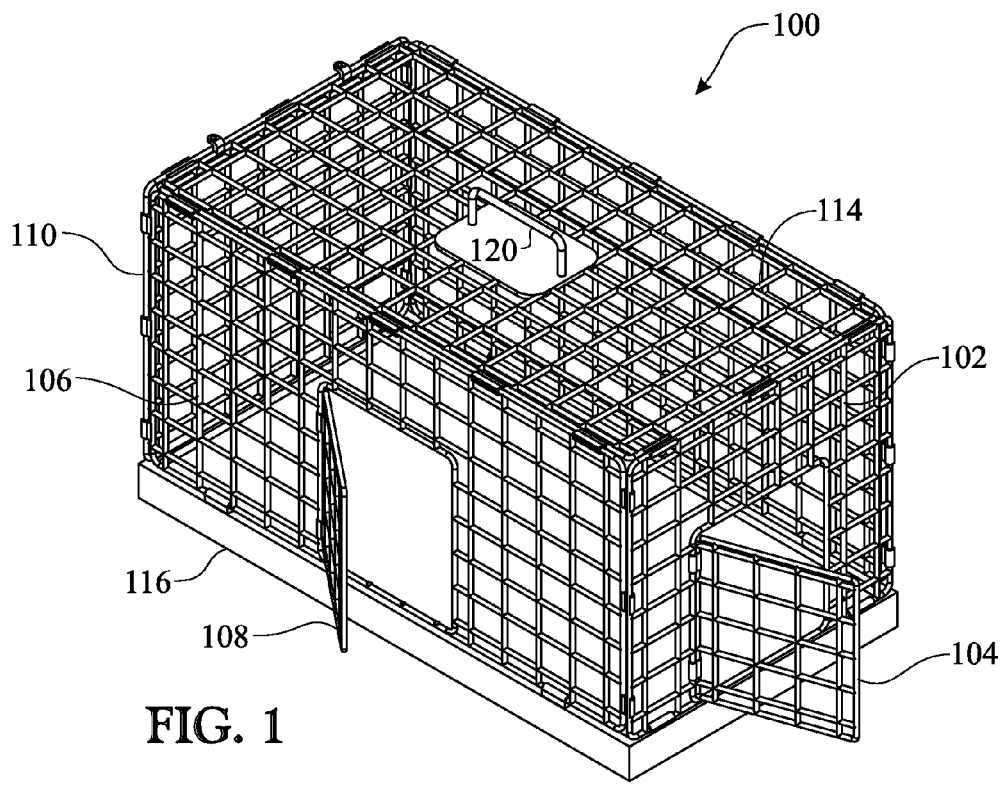
FIG. 1 presents a top right isometric view of a pet kennel embodying the present invention, wherein an end panel is removable therefrom.
Figure 2:
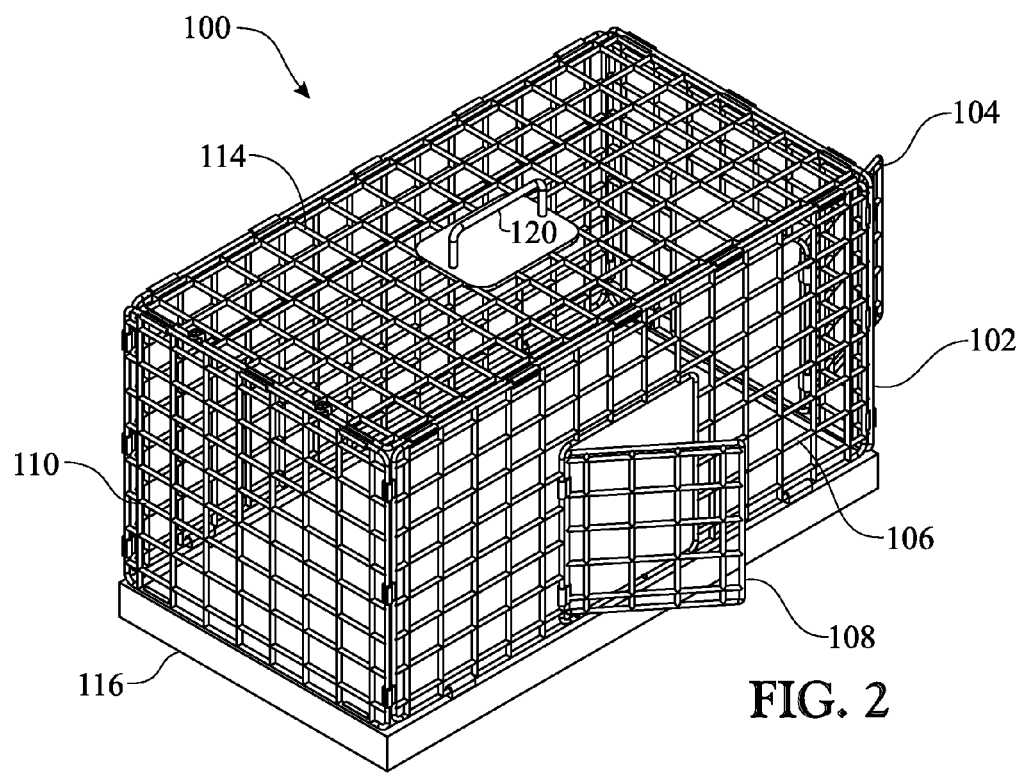
FIG. 2 presents a top left isometric view of the pet kennel of FIG. 1.

In one exemplary implementation of the invention, a pet kennel or crate 100 is shown in FIGS. 1-2 illustrating its various components. For purposes of description herein, the terms "crate" and "kennel" are used interchangeably. The kennel 100 includes a plurality of peripheral panels, for example, a left end panel 110 and a right end panel 102, including a door 104 that can be selectively opened and closed to allow entry of a pet. End panels 102, 110 are separated from one another by a rear side panel 112 (FIG. 3) and a front side panel 106, which can also include a door 108 that can be selectively opened and closed to provide a secondary access for pet entry. Those practiced in the art will recognize that doors 104, 108 also include a latching mechanism, the configuration of which is well known in the art and has been deleted for the sake of clarity. Further, doors 104, 108, although illustrated being hinged on one side thereof, can also be configured to slide, retract, lift up and fold over the top, or employ any other known mechanism for being selectively opened and closed.

The combined panels 102, 106, 110 and 112 (FIG. 3), are arranged in a rectilinear fashion to form the periphery of kennel 100, and a top 114 is attached to an upper edge thereof. Those practiced in the art will readily recognize that the kennel 100 can be constructed in any one of multiple geometric configurations. The rectilinear configuration illustrated herein is shown for simplicity and other geometric configurations are contemplated. The top 114 can also have a handle 120 attached thereto for the convenience of the pet owner to pick up and move the kennel 100. As illustrated, the panels 102, 106, 110, and 112 and top 114 are constructed of a wire mesh wherein the mesh openings are sufficiently small to prevent a pet from climbing through while permitting the flow of fresh air therethrough, however, one or more of the panels 102, 106, 110, and 112 and top 114 can be constructed of a solid sheet of material as long as one and preferably a plurality of the panels are at least partially constructed of the described mesh for the purposes of airflow therethrough. Further, while the panels 102, 106, 110, and 112 and top 114 are illustrated herein as a metal wire mesh, the panels can be constructed from any type of durable material impervious to the chewing of a pet. Furthermore, it will be apparent to those skilled in the art that the panels can have virtually any construction, including wrought iron and the like, as long as means are provided for facilitating air flow through the crate.

The panels 102, 106, 110, and 112 and top 114 may be hingedly affixed to a bottom 116. The bottom 116 can be constructed of a solid sheet formed in a tray-like manner such that any liquids or solids (e.g., water and food) are retained therein and segregated from the floor on which the kennel 100 rests. Those practiced in the art will readily recognize that in lieu of the panels 102, 106, 110, and 112 and top 114 being attached to a solid tray, bottom 116 can also be formed as a mesh panel (not shown) with a separate tray (not shown) selectively insertable therein.

Figure 3:
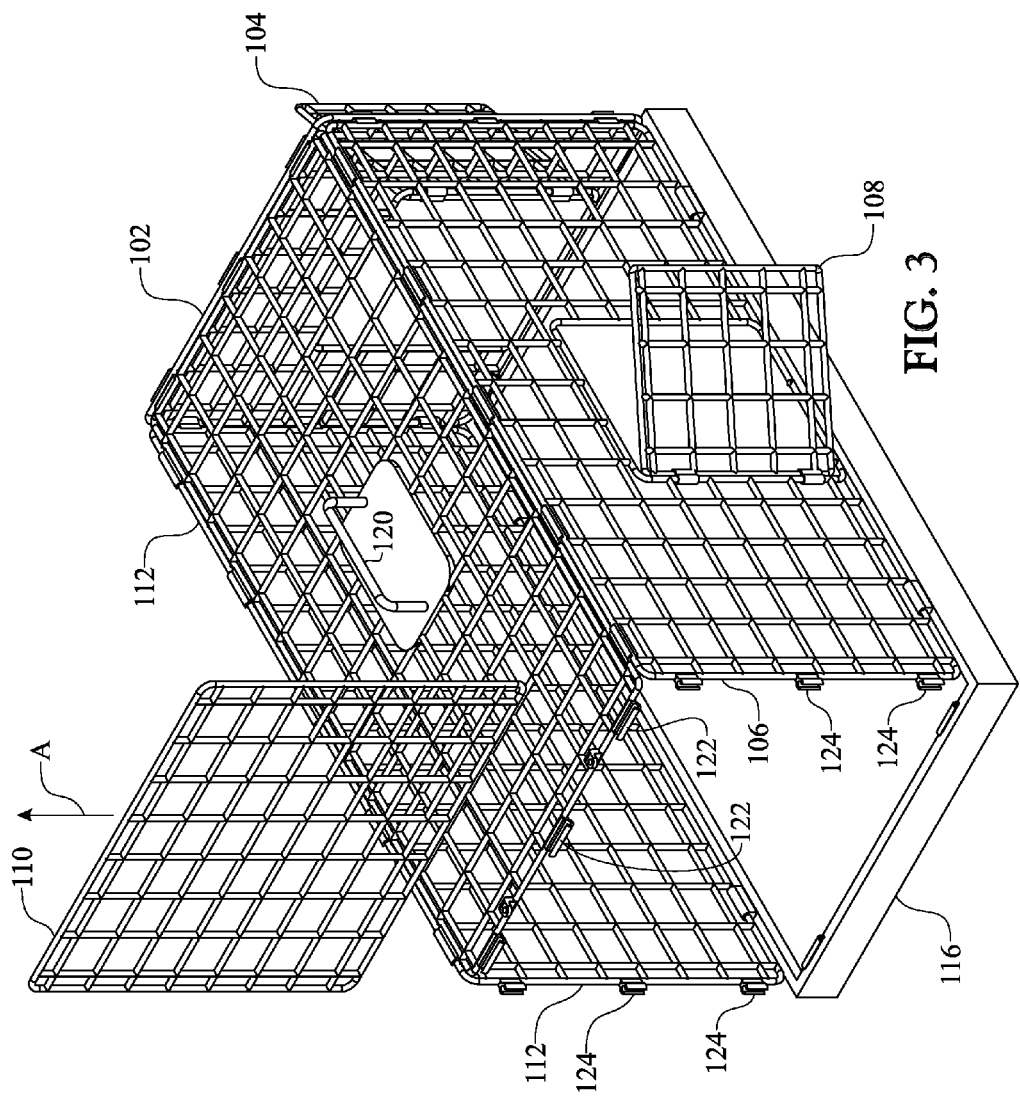
FIG. 3 presents a top left isometric view of the pet kennel of FIG. 1 illustrating the removal of an end panel therefrom.

Referring now to FIG. 3, the left end panel 110 is shown as being selectively removable (arrow 'A') from the kennel 100 by disengagement from top retainers 122 and side retainers 124. Retainers 122, 124 are of a configuration to securely retain left end panel 110 in a manner such that a pet housed within kennel 100 cannot dislodge the panel 110 therefrom. Upon removal of the left end panel 110, and end perimeter is formed by the left ends of the tray 116, side panels 106 and 112, and top 114. Although this exemplary implementation illustrates a removable panel, it will be apparent to those skilled in the art that the left end panel 110, in lieu of being completely removable, can be incorporated having any type of structure enabling it to be re-positioned to facilitate access into the crate interior, including, but not limited to, a sliding construction, a retractable construction, a swinging construction and any combination thereof.

Figure 4:
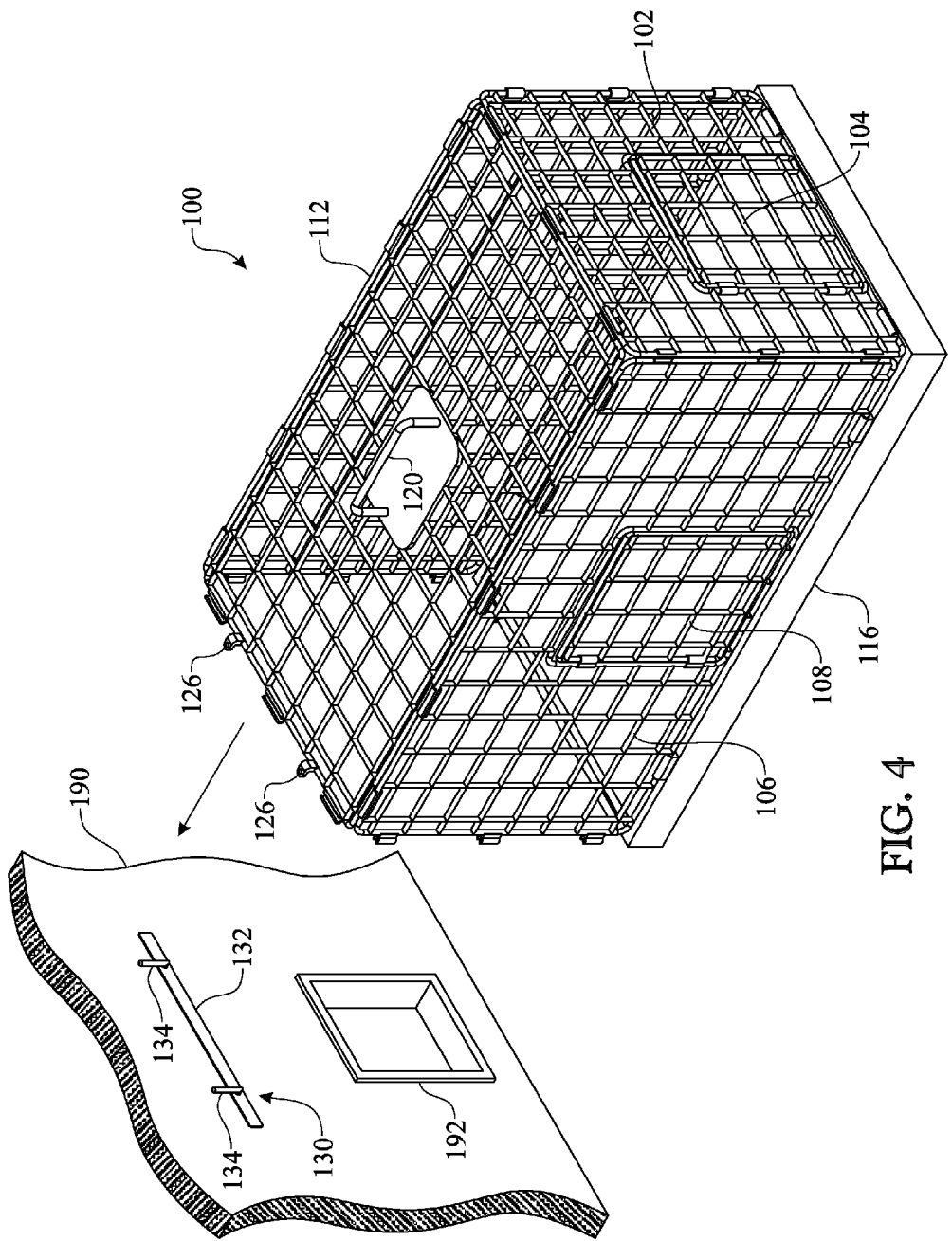
FIG. 4 presents a top right isometric view of the pet kennel of FIG. 1 having an end panel removed therefrom and positioned proximate to a pet door installed in the structure of a building.

As illustrated in FIG. 4, a segment of a building structure such as an exterior wall or an exterior door 190 has installed therein a pet door 192 through which a pet, such as a dog, can freely pass through from interior to exterior and back again. Such a pet door 192 is well known in the art and can be one of any known configurations all included within the scope hereof. A bracket assembly 130 is affixed to the building structure 190 above pet door 192. In this exemplary implementation, the bracket assembly 130 includes a bracket 132 having attached thereto at least two upwardly extending pins 134. The bracket assembly 130 is positioned above the pet door 192 in a manner such as to correlate to the upper peripheral edge of the left end of top 114. As illustrated, the left end of top 114 further includes receivers 126 attached thereto wherein each receiver 126 includes a vertically oriented aperture. As will be apparent to those skilled in the art, any of a myriad of other known structural attachment mechanisms can be employed to enable selective releasable attachment of the crate to the wall. Furthermore, the selective releasable attachment can optionally include a locking mechanism to enable the user to selectively attach and lock the crate to the wall-mounted attachment structure.

Figure 5:
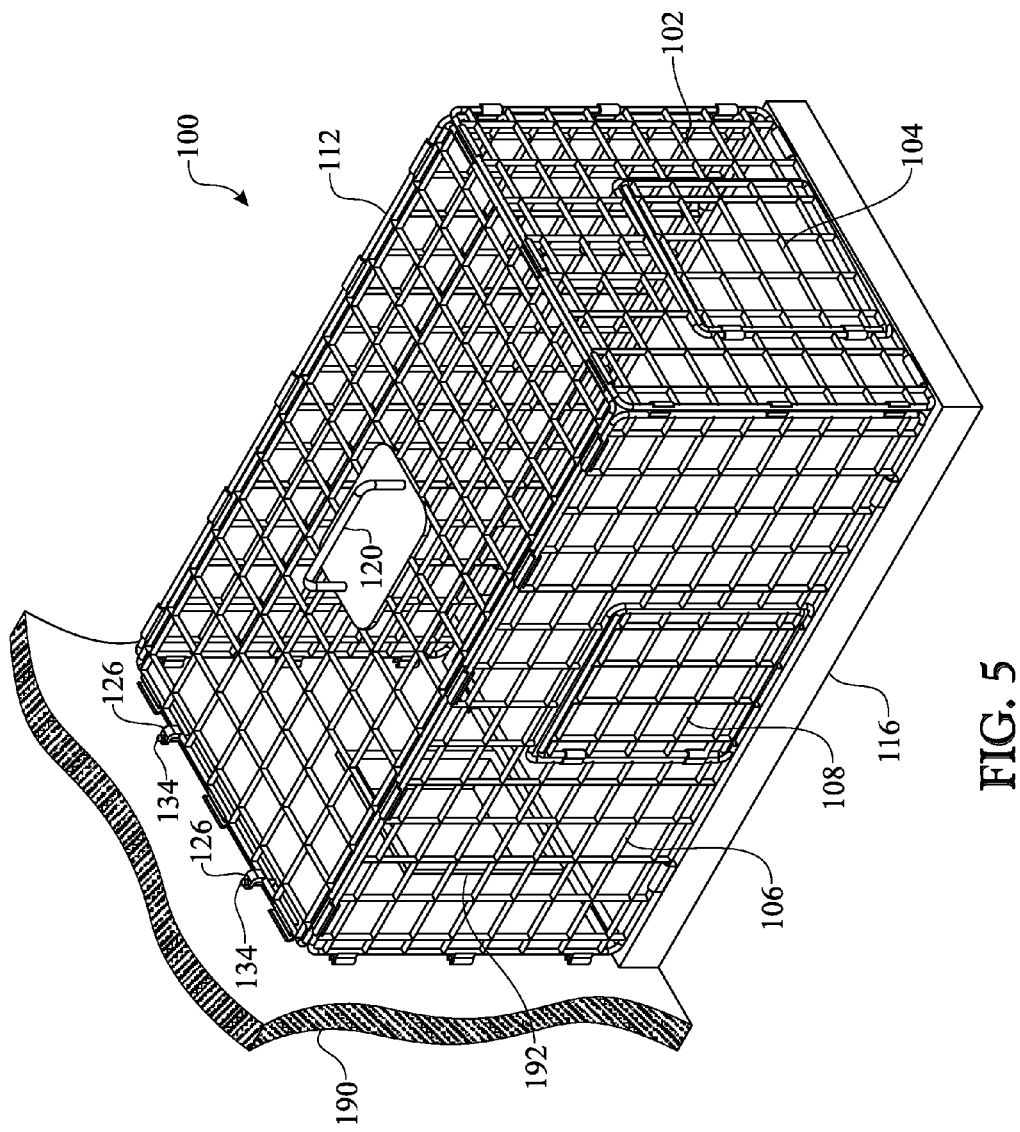
FIG. 5 presents a top right isometric view of the pet kennel of FIG. 1 engaged with a mating bracket assembly affixed to the building structure.

As further illustrated in FIG. 5, in this exemplary implementation the kennel 100 is positioned such that the pins 134 of the bracket assembly 130 are received in the apertures of the receivers 126 on the kennel 100. In this manner, the kennel 100 is secured to the building structure 190 with the pet door 192 positioned at the left end of kennel 100. In this configuration, the pet, such as a dog, can be housed in the controlled climate of the interior of the structure while allowing the pet to freely exit to the outdoors for exercise and return to the confines of the kennel 100.

Figure 6:
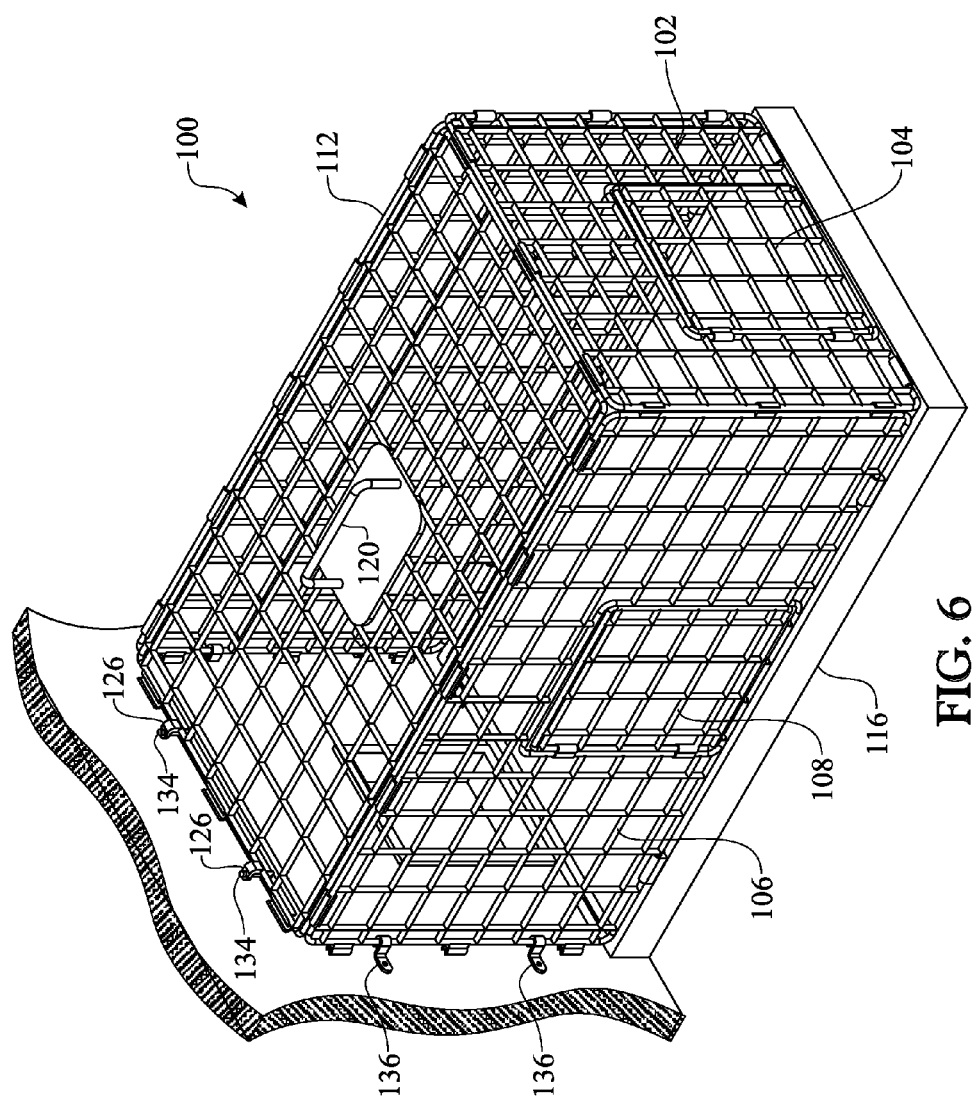
FIG. 6 presents a top right isometric view of the pet kennel including clamps engaging the side panels.
Figure 7:
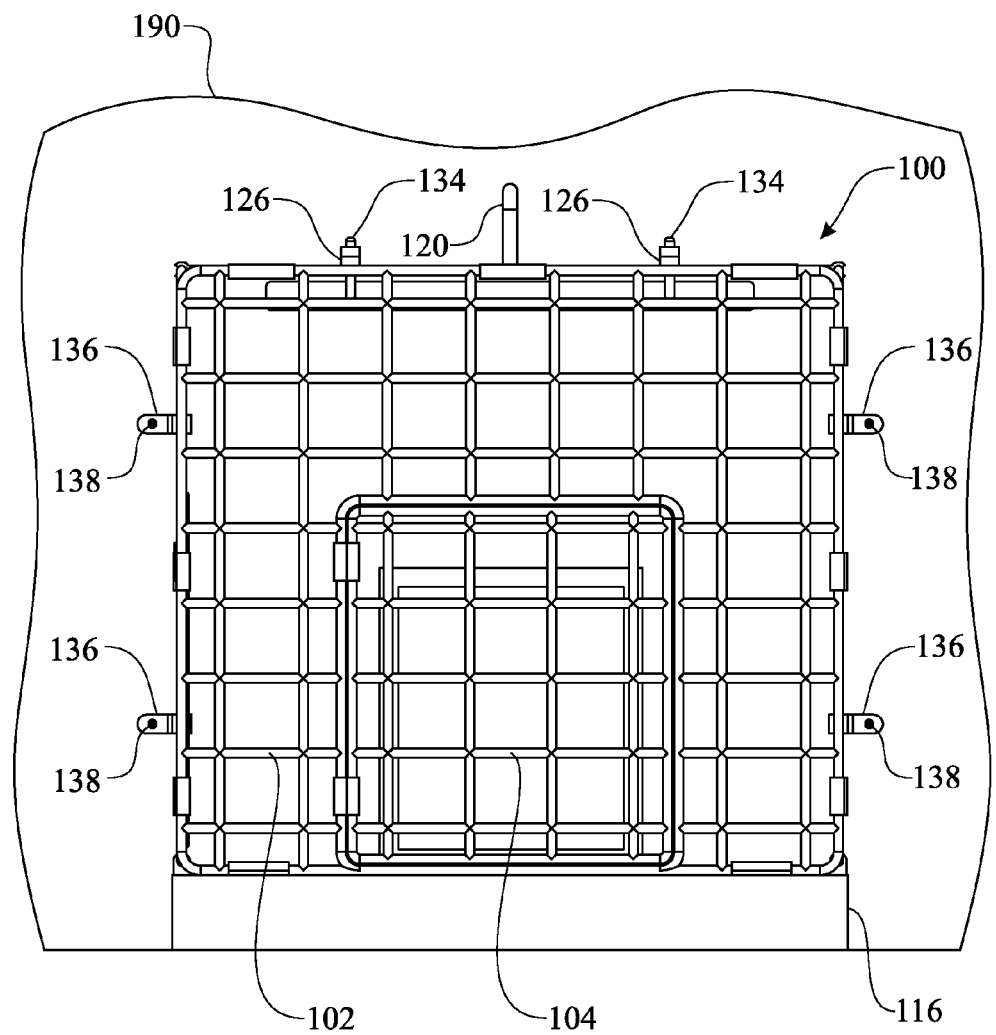
FIG. 7 presents a right end elevation view of the kennel of FIG. 1 affixed to the building structure.

Referring now to FIGS. 6-7, the kennel 100 can be further secured to the structure 190 with clamps 136 and fasteners 138. The clamps 136 engaging the ends of side panels 106, 112 are fastened to the structure 190 with fasteners 138. The clamps 136 can be of any known configuration which permanently affix the kennel 100 to the structure 190 or alternatively permit the selective engagement and disengagement of the kennel 100 from the structure 190. The manner of securing the kennel 100 to the building structure 190 is such that the pet owner can easily detach the kennel 100 from the structure 190, but the pet is unable to do so. One alternative embodiment of bracket assembly 130 includes a bracket 132 conforming to the end perimeter of the kennel 100 with a plurality of vertically oriented pins 134 affixed thereto such that the pins 134 engage a corresponding receiver 126 affixed to the ends of side panels 106, 112 and top 114. At least one pin 134 is lockable to prevent an unwanted intruder from reaching through pet door 192 to disengage the kennel 100 from the structure 190 and a corresponding unwanted entry by the intruder.

Figure 8:
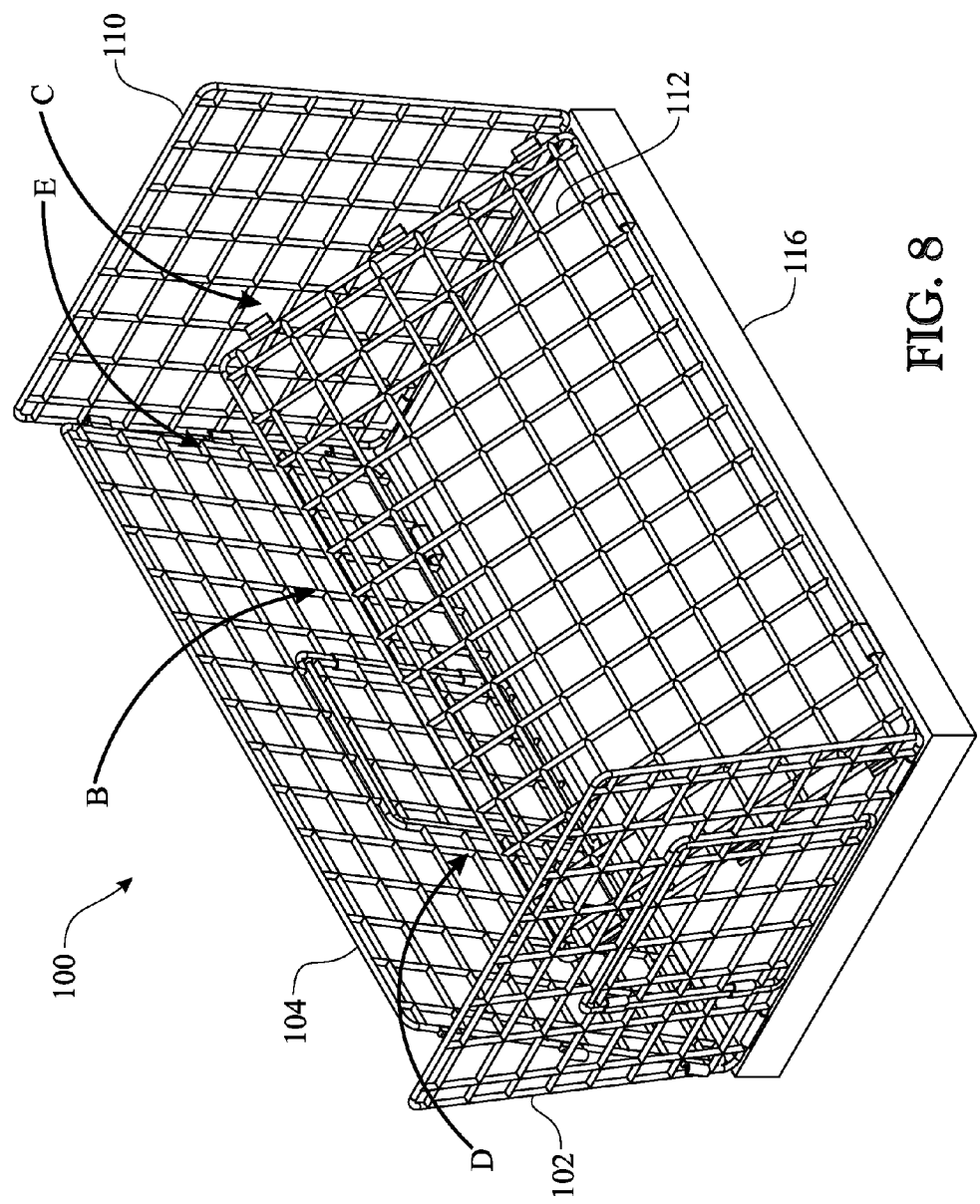
FIG. 8 presents a left rear isometric view of the pet kennel being folded for transport or storage.

As illustrated in FIG. 8, the kennel 100 can be collapsed for storage or transport by removing the top 114 and folding and panel 102 according to arrow D, side panel 104 according to arrow B, end panel 110 according to arrow E, and side panel 112 according to arrow C. Alternatively, top 114 can be maintained in a hinged configuration with side panels 104 and 112 such that the panels 104, 112 and top 114 can be maneuvered to fold as a single unit in a manner known in the art.

The pet kennel 100 illustrated herein when attached to the structure 190 as disclosed, allows a pet access to the indoors of this structure to enjoy the climate controlled home and escape the extremes of heat or cold, for rest, or warn residents of impending danger, without having access to fully roam the house while also providing access to the outdoors to attend to bodily functions, play, eat, drink, and patrol the exterior property environs. In this manner, the pet can enjoy a stress-free environment while the owners are absent to help eliminate separation anxiety since the pets are not trapped in a stand-alone kennel or trapped outdoors in extreme weather. The kennel 100, when affixed to building structure 190 at a pet door 192, aids in the teaching of young pets for house training since they can leave the kennel 100 on their own volition to go outside. Pets naturally do not want to perform bodily functions where they sleep. Further, pet owners have peace of mind that their pet is not trapped in a stand-alone kennel, therefore there is no need to rush home to let the pet out, or conversely to rush home to let the pet inside since the pet is not trapped outdoors. Additionally, the pet owner has peace of mind that the pet is not roaming the house and potentially damaging furniture or other personal property. The kennel 100 is versatile since it can easily be used as a "standard" kennel when desired, by moving to another room or can be folded up and taken along during travels away from home.

In use, a pet (not shown) can be kenneled within a building structure having a pet door 192 installed in a structural segment 190 in a manner such that the pet is restrained to the confines of a kennel 100 within the building while permitting the pet unrestricted access to an exterior of the building. In the exemplary implementation, the bracket assembly 130 is affixed to the interior of the building structure above the pet door 192 in a manner to secure it thereto such as by use of fasteners, welding, or other known methods of affixation. The end panel 110 is removed from the kennel 100 and is mated with the bracket assembly 130 by telescopically sleeving the receivers 126 affixed thereto over the vertical pins 134 of the bracket assembly 130. Clamps 136 can be attached to the ends of the side panels 106, 112 forming a portion of the end perimeter and affixed to the building structure with fasteners 138. The pet (not shown) is placed in the kennel 100 through either door 104 or door 108 and then closing the door and locking it in its closed position. In this manner, the pet can enjoy the controlled climate within the building and concurrently have free access through the pet door 192 to the exterior of the building and can freely return.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A pet kennel assembly particularly configured to constrain a pet's access to a home indoor area while simultaneously providing egress from a pet kennel, via a pet door extending through a home wall, to a home outdoor area, the pet kennel assembly comprising:
   a multi-sided pet kennel housing, forming a pet enclosure when fully deployed, including a bottom panel, a top panel and a plurality of side panels extending therebetween, a first side panel generally bounded by home wall-facing edges of a pair of opposite second and third side panels, said top panel and said bottom panel of said pet kennel housing, said first side panel being selectively movable between a fully-closed position adjacent to said home wall-facing edges of said pet kennel housing and a fully-opened position displaced away from said home wall-facing edges of said pet kennel housing, wherein when said first side panel is in said fully-opened position said home wall-facing edges of said of said pet kennel housing define a home wall-facing open side of said pet kennel housing; and
   a pet kennel housing-to-home wall attachment sub-assembly, comprising:
      a first attachment structure fixedly secured to said pet kennel housing proximate to said home wall-facing open side thereof being defined by said home wall-facing edges when said first side panel is disposed in said fully-opened position; and
      a second mechanical attachment structure fixedly secured to said home wall proximate to said pet door, said second mechanical attachment structure releasably attachable to said first attachment structure when said first side panel is disposed in said fully-opened position and said home wall-facing edges of said pet kennel housing are defining said home wall-facing open side of said pet kennel housing,
   wherein, with said first side panel in said fully opened position being displaced away from said home wall-facing edges of said pet kennel housing, and said first and second attachment structures secured to one another, said home wall-facing edges of said pet kennel housing generally butt up against an interior surface of said home wall about said pet door to constrain the pet within said kennel housing on the interior of the home while enabling egress from the kennel housing, through the pet door, to a home exterior area.

2. The pet kennel assembly as recited in claim 1, wherein said kennel housing is permanently affixed to the home wall, said first attachment structure further comprising at least one kennel housing tab and said second attachment structure further comprising at least one corresponding threaded fastener fastened through the corresponding tabs and into said home wall.

3. The pet kennel assembly as recited in claim 1, wherein said first side panel is slidably removable from the remainder of said pet kennel housing.

4. The pet kennel assembly as recited in claim 1, wherein said kennel housing is releasably attachable to the home wall, said second attachment structure further comprising a mounting structure permanently secured to said home wall, and said first attachment structure further comprising a mechanical structure particularly configured for releasable attachment to said permanent mounting structure.

5. The pet kennel assembly as recited in claim 4, wherein said first and second attachment structures are configured for selective locking engagement with one another.

6. The pet kennel assembly as recited in claim 1, wherein at least one of said side panels has an open-air construction for facilitating airflow through said pet kennel housing.

7. A pet kennel assembly particularly configured to constrain a pet's access to a home indoor area while simultaneously providing egress from a pet kennel, via a pet door extending through a home wall, to a home outdoor area, the pet kennel assembly comprising:
   a multi-sided pet kennel housing forming a pet enclosure when fully deployed, including a bottom panel, a top panel and a plurality of side panels extending therebetween, a first side panel generally bounded by home wall-facing edges of a pair of opposite second and third side panels, said top panel and said bottom panel of said pet kennel housing, said first side panel being selectively movable between a closed position adjacent to said home wall-facing edges of said pet kennel housing and an opened home wall-mounting position displaced away from said home wall-facing edges of said pet kennel housing; and
   a pet kennel housing-to-wall attachment sub-assembly, comprising:
      a first attachment structure fixedly secured to said pet kennel housing proximate to said home wall-facing edges thereof, with said first side panel being disposed in said opened wall-mounting position displaced away from said home wall-facing edges of said pet kennel housing; and a second mechanical attachment structure fixedly secured to said home wall proximate to said pet door, said second mechanical attachment structure releasably attachable to said first attachment structure when said first side panel is disposed in said opened home wall-mounting position being displaced away from said home wall-facing edges of said pet kennel housing, wherein, with said first side panel disposed in said opened wall-mounting position being displaced away from said home wall-facing edges of said pet kennel housing, and said first and second attachment structures secured to one another, a resulting opening in said pet kennel housing bounded by said home wall-facing edges thereof coincides with said home wall with the pet door to constrain the pet within said kennel housing on the interior of the home while enabling egress from the kennel housing, through the pet door, to a home exterior area.

8. The pet kennel assembly as recited in claim 7, wherein said first side panel is slidably removable from the remainder of said pet kennel housing.

9. A pet kennel assembly configured to constrain a pet indoors while selectively facilitating access to out-of-doors, comprising:

a pet kennel housing comprising
  a bottom,
  a plurality of peripheral panels attached to said bottom and extending upwardly therefrom,
  a top affixed to an upper edge of said plurality of peripheral panels, and
  at least one access door selectively openable and closable and integrated into at least one of said peripheral panels for access to an interior of said pet kennel housing,
  wherein another one of said peripheral panels, forming said end perimeter other than said one peripheral panel, at an end perimeter of said pet kennel housing is removable from said end perimeter so as to provide an end opening of said pet kennel housing at said end perimeter formed by said bottom, said top and a pair of said peripheral panels; and
a bracket assembly joinable with an end of at least one of only said pair of peripheral panels and said top at said end perimeter of said pet kennel housing.

10. The pet kennel according to claim 9 wherein said peripheral panels comprise two end panels and two side panels.

11. The pet kennel according to claim 10 wherein said at least one of said peripheral panels having said access door integrated therein is one of said end panels; and wherein at least one other of said peripheral panels having an access door integrated therein is one of said side panels.

12. The pet kennel according to claim 10 wherein said another one of said peripheral panels is a removable end panel opposite from said one end panel having said access door integrated therein.

13. The pet kennel according to claim 12 wherein said bracket assembly includes at least two pins extending vertically therefrom and further wherein an end of said top includes a number of receivers corresponding to said pins, each said receiver defining a vertical aperture therethrough, each said receiver receiving one of said pins therein.

14. The pet kennel according to claim 13 wherein at least one of said vertical pins is selectively lockable to prevent said pin from being removed from a corresponding one of said receivers.

15. The pet kennel according to claim 13 further including a plurality of clamps engaging a portion of said end perimeter defined by said side panels, said clamps including fasteners therethrough for permanently affixing said crate to a structural element of a building interior and collocated with a pet door installed therethrough.

16. The pet kennel according to claim 12 wherein said pet kennel housing defines said end perimeter at said removable end panel of said kennel and wherein an end of said top and ends of said side panels defining a portion of said end perimeter includes a plurality of receivers, each said receiver defining a vertical aperture therethrough, and further wherein said bracket assembly includes a bracket conforming to a plurality of said panels defining said end perimeter and a plurality of vertical pins affixed thereto, each said vertical pin being received in said aperture of one of said receivers.

17. The pet kennel according to claim 16 wherein at least one of said vertical pins is selectively lockable to prevent said pin from being removed from a corresponding one of said receivers.

18. The pet kennel according to claim 9 wherein said top, bottom and peripheral panels have a collapsible construction for facilitating transport and storage in a non-deployed state.

* * * * *